(No Model.)
C. H. THURSTON.
BICYCLE SUPPORT.
No. 577,993. Patented Mar. 2, 1897.
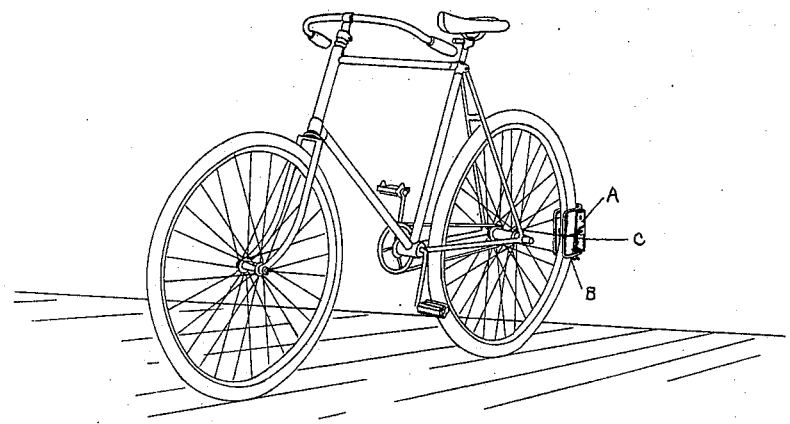
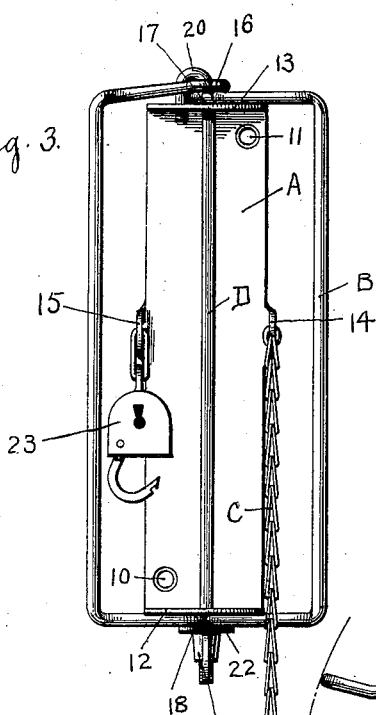
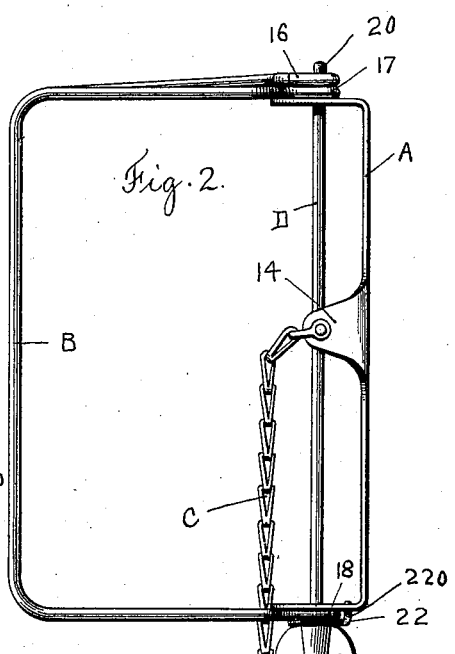
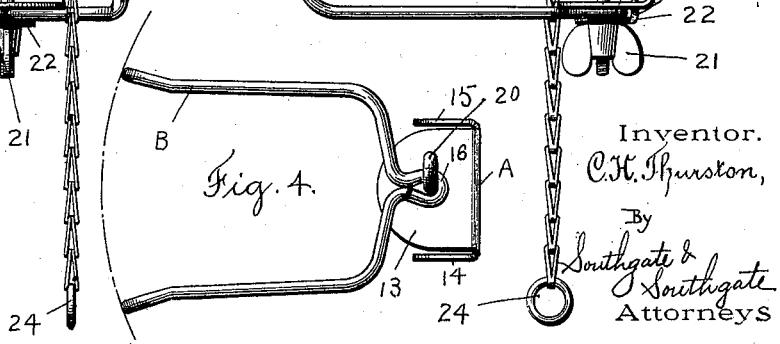
Witnesses.
Inventor.
C. H. Thurston,
By Southgate & Southgate
Attorneys

UNITED STATES PATENT OFFICE.

CHARLES H. THURSTON, OF WORCESTER, MASSACHUSETTS.

BICYCLE-SUPPORT.

SPECIFICATION forming part of Letters Patent No. 577,993, dated March 2, 1897.

Application filed May 25, 1896. Serial No. 593,096. (No model.)

*To all whom it may concern:*

Be it known that I, CHARLES H. THURSTON, a citizen of the United States, residing at Worcester, in the county of Worcester and State of Massachusetts, have invented a new and useful Improvement in Bicycle-Supports, of which the following is a specification.

The object of my invention is to provide a strong, simple, and inexpensive bicycle-supporting device which may be adjusted to support the bicycle at different angles with respect to a wall.

To these ends my invention consists of the parts and combinations of parts, as hereinafter described, and more particularly pointed out in the claims at the end of this specification.

In the accompanying drawings, Figure 1 is a perspective view illustrating the manner in which a bicycle may be supported in a supporting device constructed according to my invention. Fig. 2 is a side view of my bicycle-supporting device. Fig. 3 is a front view of the same. Fig. 4 is a plan view, the locking-chain being omitted; and Fig. 5 is a detail view of a washer hereinafter referred to.

A bicycle-supporting device constructed according to my invention comprises a base-piece or bracket, which may be fastened to the wall in any of the ordinary manners, a socket-piece which is adjustably mounted on the bracket, and means for clamping the socket-piece in its adjusted position.

In connection with my bicycle-supporting device I also preferably provide a locking-chain or equivalent devices for engaging the wheel of the bicycle, so as to prevent the removal or theft of the machine.

In the accompanying drawings, A designates the base-piece or bracket, and B designates a socket-piece which is pivotally mounted therein and which may be secured in its adjusted position by means of a clamping-bolt D.

The base-piece or bracket A may be stamped up out of sheet metal in any of the ordinary or preferred manners, and, as shown, is provided with countersunk holes 10 and 11 for receiving securing-screws.

Bent over or extending from opposite ends of the base-plate A are the lugs or projections 12 and 13, upon which the socket-piece may be pivoted. At its opposite sides the base-plate A may also be provided with lugs 14 and 15 for carrying a locking-chain for fastening a bicycle so that the same cannot be removed.

The socket-piece B is preferably formed from a single piece of wire, which is bent so as to form a pocket for receiving a bicycle-wheel. As shown, the wire which forms the socket-piece B is provided at its ends with overlying eyes 16 and 17 and with an eye or socket 18 at its center. A clamping rod or bolt D passes through the eyes 16, 17, and 18, so as to pivotally connect the socket-piece B upon the lugs or projections 12 and 13 of the base-plate. At its upper end the clamping-bolt D is provided with a hook 26, which extends down through the projection 13 of the base-plate A, so as to hold said bolt from turning.

Threaded onto the lower end of the clamping-bolt B is a clamping-nut 21, preferably a butterfly-nut, which is arranged to clamp the socket-piece B in its adjusted position with respect to the base-plate.

In practice I preferably interpose a washer 22 between the clamping-nut 21 and the socket-piece to prevent the nut from becoming unscrewed. As shown, the washer 22 is provided with a tailpiece 220, which fits into the projection 12 and holds the washer from turning. By means of this construction it will be seen that when the clamping-nut is loosened the socket-piece can be adjusted with respect to the base-plate so as to hold a bicycle at any desired angle with respect to the wall to which my bicycle-supporting device is fastened.

By tightening the clamping-nut 21 the parts will be rigidly secured in their adjusted position. The locking-chain C is fastened at one end in the lug or projection 14 of the base-plate A, and is provided at its opposite end with a ring 24, which is adapted to engage with a padlock or other suitable device 23, carried by the lug or projection 15 of the base-plate. By means of this construction it will be seen that I have provided simple and efficient means for locking a bicycle in a supporting device so that the same cannot be readily detached or stolen.

In some cases, instead of using a lock for fastening the securing-chain C, I may use simply a hook or eye for this purpose, and this construction may be employed where it is desired simply to prevent the accidental displacement of the bicycle from its supporting device.

I am aware that changes may be made in bicycle-supporting devices by those who are skilled in the art without departing from the scope of my invention, as expressed in the claims. I do not wish, therefore, to be limited to the form which I have shown and described; but What I do claim, and desire to secure by Letters Patent of the United States, is—

1. The combination of a base-piece or bracket, a socket-piece, a rod or bolt for pivotally connecting said parts, and a clamping-nut threaded onto the rod for securing the parts in their adjusted position, substantially as described.

2. The combination of a sheet-metal base-piece or bracket having lugs or projections at opposite ends, a wire socket-piece having loops or eyes, a clamping rod or bolt engaging said loops or eyes and pivotally connecting the socket-piece with the base-plate, and a clamping-nut for securing the parts in their adjusted position, substantially as described.

3. The combination of a sheet-metal base-plate having lugs or projections at its opposite ends, a wire socket-piece having loops or eyes, a clamping bolt or rod engaging said loops or eyes and pivotally connecting the socket-piece with the base-plate, said clamping-rod having a hooked or bent portion at its end to prevent the same from turning, and a butterfly clamping-nut threaded onto the clamping-rod for holding the parts in their adjusted position, substantially as described.

4. The combination of a bicycle-support comprising a base-plate A, a wire socket-piece or frame B, a clamping-bolt for pivotally connecting said parts and securing them in their adjusted position, and a locking-chain and padlock for securing the bicycle-wheel in the socket-piece, substantially as described.

In testimony whereof I have hereunto set my hand in the presence of two subscribing witnesses.

CHARLES H. THURSTON.

Witnesses:
LOUIS W. SOUTHGATE,
PHILIP W. SOUTHGATE.